Oct. 29, 1940.  E. F. HATHAWAY ET AL  2,220,040
WEAR MEASURING DEVICE
Original Filed Nov. 30, 1937   6 Sheets—Sheet 5

Inventors:
Edgar F. Hathaway,
Walter Bixby,
by Emery, Booth, Townsend, Miller + Weidner
Attys Oct. 29, 1940.   E. F. HATHAWAY ET AL   2,220,040
WEAR MEASURING DEVICE
Original Filed Nov. 30, 1937    6 Sheets-Sheet 6

Inventors:
Edgar F. Hathaway,
Walter Bixby,
By Emery, Booth, Townsend, Miller & Weidner
Attys Patented Oct. 29, 1940

2,220,040

UNITED STATES PATENT OFFICE 2,220,040

WEAR MEASURING DEVICE

Edgar F. Hathaway, Wellesley, and Walter Bixby, Dorchester, Mass., assignors to Shawmut Engineering Company, Dorchester, Mass., a corporation of Massachusetts Original application November 30, 1937, Serial No. 177,376. Divided and this application February 8, 1939, Serial No. 255,272

21 Claims. (Cl. 33—147)

Our present invention relates to testing the wearing qualities of various sheet materials such as fabrics, webbing, floor coverings and others, by effecting wear on them analagous to that expected in actual use, and more particularly to the measuring and recording of such wear. This application is a division of our copending application Serial No. 177,376 filed November 30, 1937.

In the drawings illustrating by way of example certain embodiments of the invention.

Figs. 8 to 11 illustrate operating and control mechanism for the wear-measuring feeler, whereby the machine may be set to effect wear measurements at different times, wherein

Figure 2:
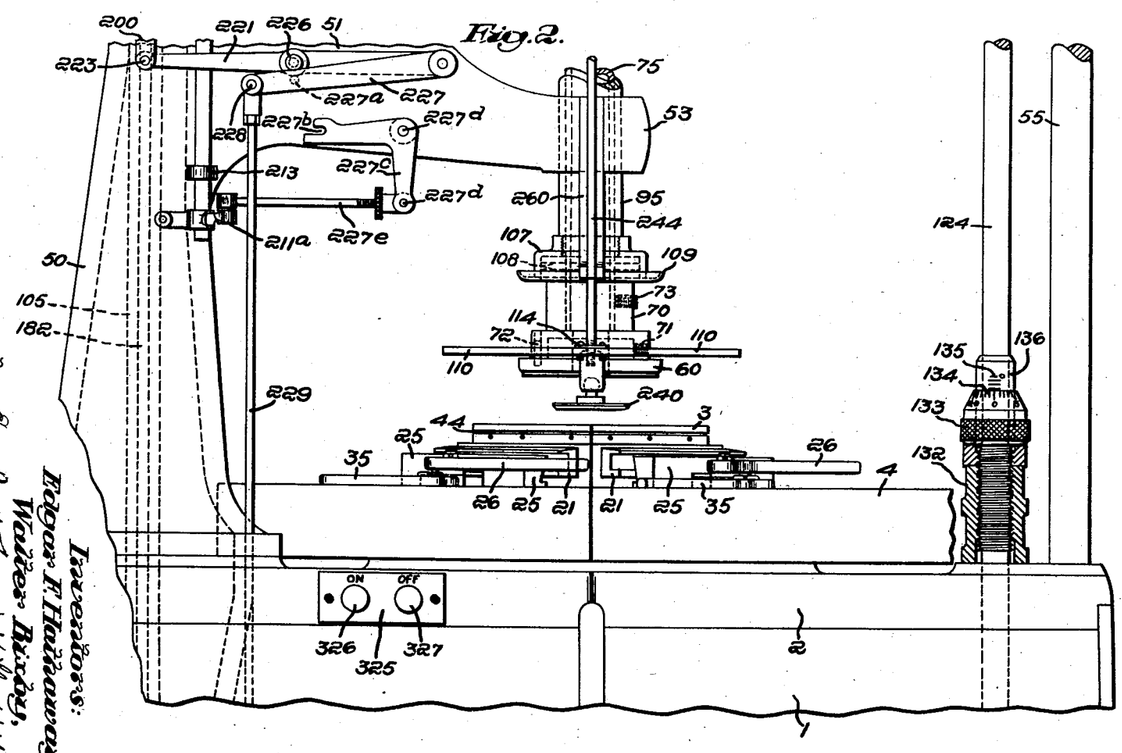
Fig. 2 is a similar view showing the immediately lower portion of the apparatus, including the support for the specimen, the wearing element and the wear measuring instrument, Fig. 2 being in effect a downward continuation of Fig. 1.
Figure 3:
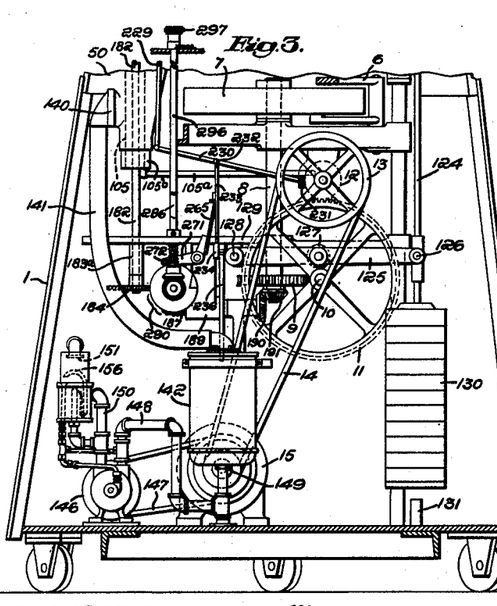
Fig. 3 is a vertical section, on a smaller scale, of the lower portion of the apparatus, including the cabinet base and its movable mounting, the receiving end of the dust-collecting system, and showing the general arrangement of the operating and control mechanism.

The apparatus as herein illustrated includes a lower supporting portion comprising suitable framing and an enclosing cabinet 1, see particularly Fig. 3, in which the main operating parts are housed. As in the previous application the device as a whole may be set on wheels or castors for readily shifting it to various points of use. Supported on the framing and closing in the top of the cabinet 1 is a table or platform 2, Fig. 2, on or about which the wearing, measuring and recording instrumentalities are disposed. It will be noted that Figs. 1 and 2 are views looking at the apparatus from one corner of the base portion.

The fabric or other specimen to be tested is secured flatwise on a platen or specimen-holder 3 above and substantially central of the platform 2 and supported for movement in its own horizontal plane in a similar manner as in the preceding application. In view of the full disclosure in said application it is sufficient for present purposes to note that the platen 3 as a whole receives a sinuous movement in a closed path, this movement being compounded of that of a crosshead which is movable on guides on the platform 2 in one and the reverse directions, and which in turn supports the platen for movement at right angles relatively to the crosshead. These relative movements and the total resulting compound movement of the platen are produced by cam mechanism in the base portion similarly as in our previous application, now Patent No. 2,100,332, with which the parent application above identified was copending.

As partially shown in Fig. 3, sufficiently for an understanding of the present invention, said mechanism includes cam levers, one set of which is seen at 6, cooperating with cam tracks in the upper and lower faces of the platen cam 7 on a main vertical shaft 8. This shaft is driven by a worm gear 9 meshing with a worm on the same short shaft 10 with a large gear 11. The latter in turn is driven by a gear 12 coaxial with a pulley 13 driven by a belt connection 14 from the motor 15, by which all the moving parts are operated in the illustrated embodiment.

Figure 1:
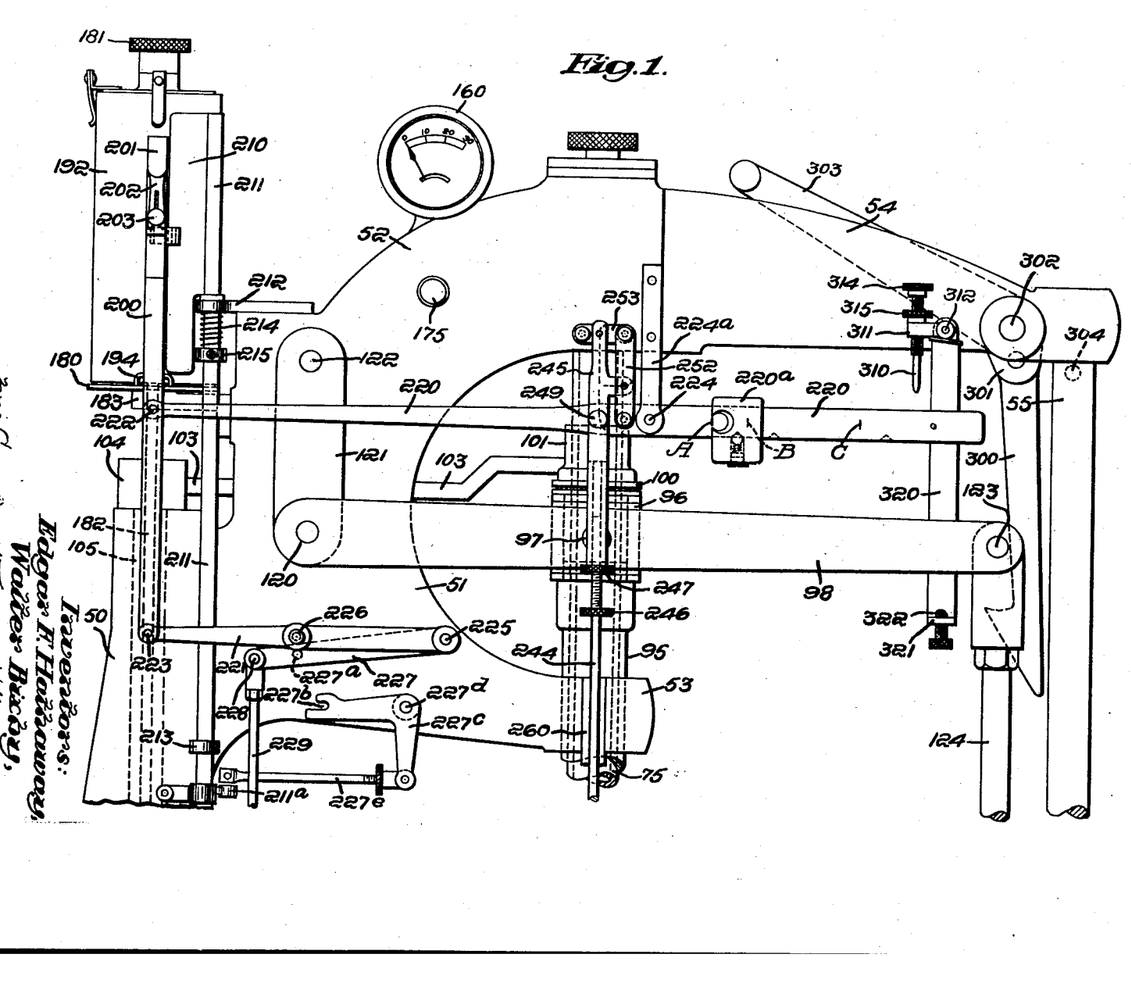
Fig. 1 is an elevation of the upper portion of one form of the wear testing apparatus.

Referring to Figs. 1 and 2, there is provided above the main platform 2 an upper frame including a hollow pedestal 50 at one corner portion of the platform. Projecting inwardly from the pedestal is a frame piece 51 having upper and lower arms 52, 53. The upper arm 52 together with an extension 54 thereof forms an arch spanning the specimen platen, diagonally of the platform 2. At its end opposite the pedestal 50 this arch is supported by a post 55 rising from the lower framing in the cabinet 1. This upper frame serves to support the wear-producing mechanism and other associated parts to be described.

The wearing action on the test specimen is performed by a shoe 60, Fig. 2, in cooperation with the moving platen 3, through the oscillation of the shoe while in pressing contact on the moving specimen, with or without an action of intermittent impact of the shoe upon the specimen.

The shoe 60, of circular form, is removably secured in a socket in the bottom of a shoe holder 70, as by one or more set screws 71. A dowel 72 in the holder socket and receivable in a corresponding recess in the shoe positively locks the shoe against turning in its holder.

Said shoe holder 70 is demountably held, as by set screws 73, at the lower end of the vertical tubular shoe-carrying shaft 75. This shaft, and consequently the shoe 60, is supported for rotary oscillation about its own axis and also for vertical reciprocation, the upper end of the shaft being slidably and rotatably received in the hollow upper arm 52 of the top frame.

The shoe shaft 75 is guided, for rotation and vertical reciprocation, by a sleeve bearing 95, Fig. 1, the upper end of which is fastened in a crosshead 96 having lateral trunnions 97 journalled in the shoe lifter arm 98. This lifter arm is a double or forked element, the crosshead 96 being received between its two parts, as clearly seen in Fig. 11. The shoe shaft 75 and said sleeve bearing 95 move up and down together, while the shaft is also given an oscillatory movement in said sleeve bearing and in the crosshead 96. An anti-friction bearing 100 is provided above the crosshead and the sleeve 95, between said parts and a collar 101 fast on the shaft and through which the latter is oscillated.

The mechanism for so oscillating the shaft is similar to that of the previous application, including an arm projecting laterally from the collar 101 on the shaft and connected through a link 103, Fig. 1, to an arm (not shown) on a collar 104, the connection between said arm of the collar 104 and the link being such as to allow up and down movement of the latter with the shaft 75. Said collar 104 is fixed at the upper end of a hollow shaft 105, Fig. 3, extending vertically through the hollow pedestal 50. Said hollow shaft 105 is oscillated by a pitman 105ª, Fig. 3, pivoted at one end, at the left in said figure, to a collar 105ᵇ fast at the lower end of said shaft and pivotally connected at its other end to a crank disk coaxial with the gear 12 and pulley 13 previously referred to.

The sleeve bearing 95 and the entire shoe operating assembly are further guided by the lower arm 53 of the top frame, through which said sleeve and the shaft 75 extend.

Referring to Fig. 2, the shoe sleeve bearing 95 terminates at its lower end in an annular flanged foot 107 seating on another anti-friction bearing 108 supported on the shoe holder 70. A laterally projecting annular cup 109 may be provided below the bearing 108, held between it and the shoe holder, for catching any oil that might escape at the bearing or other point above it, and which might otherwise reach the shoe and the test specimen. Such protection is important because even a very small quantity of oil on the wearing face of the shoe or on the specimen is likely to introduce a factor of irregularity in the test.

As an additional safeguard in this connection I may provide a further drip plate or oil and dirt catcher, preferably below the cup 109 and adapted to receive possible overflow from the latter and to catch any other dirt or foreign matter which might otherwise fall onto the specimen being tested. This additional means comprises a two-piece glass or other plate 110 straddling the shoe holder and apertured for passage of the latter. The plate sections are also recessed at their juncture line for passage of the wear-measuring feeler device to be described.

From the foregoing it will be seen that the shoe 60, its holder 70, the shoe shaft 75 and the bearing sleeve 95 and parts connected to the latter are adapted to be moved up and down by the action of the shoe lifter arm 98 to which they are connected through the crosshead 96. The shoe shaft 75, shoe holder 70 and the shoe 60 are also capable of rotary movement about the vertical axis of the shoe and shaft, but only these main parts of the shoe operating assembly participate in said rotary movement or oscillation. The bearing sleeve 95 does not oscillate, being held thereagainst by its connection with the crosshead 96, and the anti-friction bearings are located between the non-oscillatory parts and those which oscillate. This construction and arrangement facilitates the operation of the wearer unit and greatly reduces any vibration transmitted to the other parts of the apparatus, particularly during oscillation of the wearer shoe while it is down in pressing engagement on the test specimen.

The lifter arm 98 already referred to, for effecting the up and down movements of the shoe, is hung on the top frame member 51, being pivotally connected at one end, at the left in Fig. 1, as at 120, to vertical links 121, one at each side of the frame and pivoted thereon as at 122. At its other end said shoe lifter arm is pivotally connected as at 123 at the upper end of a lift rod 124 extending downwardly into the cabinet 1 and operated through mechanism therein which may be generally similar to that of the earlier application. Said mechanism is illustrated in Fig. 3 sufficiently for the purposes of the present application. Upward movement is imparted to said lift rod 124 by a horizontal cam lever 125 having its outer end pivotally connected to the lift rod, as at 126, and carrying at an intermediate point a roll 127 cooperating with an adjustable concentric or cam on the shaft 10 previously referred to in connection with the drive for the platen. Said cam lever 125 is pivotally supported at its inner end as at 128 on a fixed cross piece 129 or other stationary part.

Downward thrusting action of the shoe and a continued pressing engagement thereof on the test specimen is effected by the dropping of the cam lever 125, the lift rod 124 and the lifter arm 98 when the roll 127 rides off from its cam. The force of this downward impacting and pressing action is determined by an adjustable weight 130 at the lower end of the lift rod 124, see Fig. 3. A stop 131 may be provided below the weight 130 to limit its downward movement and that of the shoe, to avoid damage to the platen or anvil 3 or to the shoe 60 by direct contact of said parts should a specimen be worn completely through.

Means desirably is provided for accurately controlling and adjusting the extent of vertical movement given to the shoe. For this purpose, referring now to the lower right portion of Fig. 2, the lift rod 124 has a threaded portion, above the platform 2, receiving a stop collar 132 engageable with the platform to limit down movement of said rod. Also on said threaded portion of the lift rod is a setting nut 133 the upper end of which is tapered and marked with a circumferential scale 134 for cooperation with a longitudinal scale 135 on the rod 124, as on a marker sleeve 136 thereon. The scales may be calibrated in small units of vertical adjustment in the up and down movement of the wearer shoe, whereby a micrometer setting for the latter is had. The scales 134, 135 may be arranged so that by setting their zero indications opposite each other either the upper or the lower limit of adjustment for the bottom position of the shoe is obtained. The two threaded members 132 and 133 cooperate and are manipulable in the manner of a nut and lock nut, each being moved in turn until the scale setting is as desired and the two parts are in abutting, mutually locking position.

As in the earlier application, the worn particles of lint or dust are carried off from the test specimen as produced, passing up through the shoe 60 and its shaft 75 to a channel in the upper arm 52 and which continues through the base or supporting frame element 51 into the pedestal 50. Referring now to Fig. 3, the dust is taken from the pedestal 50 through an outlet 140 at its lower portion, within the cabinet 1, and through a conduit 141 communicating between said outlet and a vacuum tank 142 mounted in the cabinet and containing a dust receptacle. The negative pressure or partial vacuum in the dust-collecting system is maintained by a pump 146, Fig. 3, driven through a belt or other connection 147 with the motor. The intake side of the pump is connected through piping 148 with the outlet 149 of the vacuum tank, while the outlet or pressure side of the pump discharges through a pipe 150 opening to atmosphere at 151. The pump desirably has self-oiling provisions as described in the parent application but not necessary to explain further here. A vacuum or negative pressure gauge for the dust-collecting system desirably is mounted in a conveniently read location, as seen at 160 in Fig. 1. A bleeder valve 175 adjacent the gauge provides for relieving excess pressure.

Figure 10:
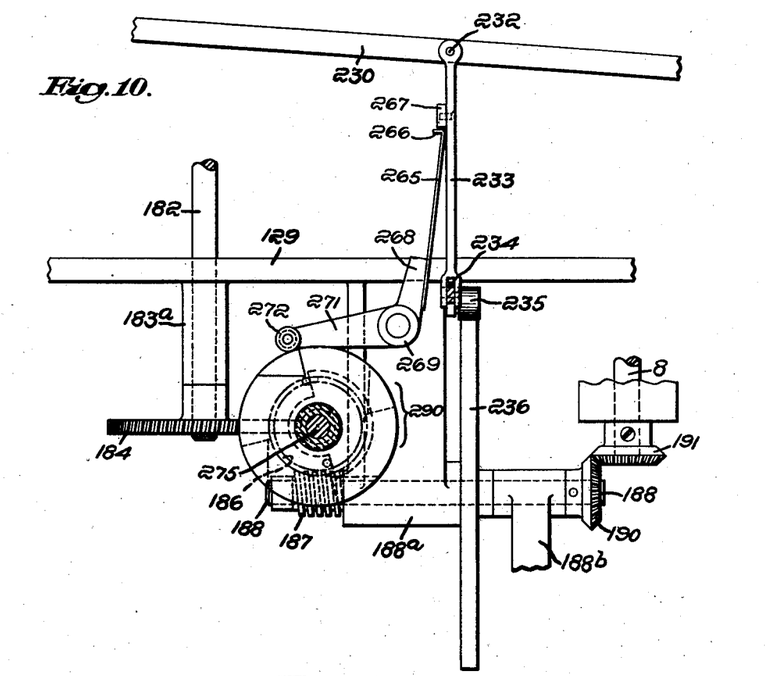
Fig. 10 shows a portion of the mechanism of Fig. 9, as if viewed from the right of said figure.

Improved means coordinated with the wearing mechanism is provided for periodically measuring the depth of wear and charting a record of the same. Referring to Figs. 1 to 4 a recorder drum 180 is demountably fixed as by a thumb nut 181 at the upper end of a vertical, rotary drum-operating or recorder shaft 182. This shaft is supported and journalled in upper and lower bearings 183, 183a and extends vertically through the shoe-oscillating shaft 105 in the pedestal 50. It is driven in accurately timed relation with the wearing mechanism, including both the specimen platen and the wearer shoe, by a worm wheel 184 at its lower end and meshing with a worm 185 fast on a horizontal shaft 275 to be more fully described; see particularly Figs. 8 to 10. It is sufficient here to note that said shaft 275 is driven at selective speeds through a clutch-controlled change-speed gearing, to be referred to later and which receives its drive from a worm gear 186 turning on a bearing bushing 186a in a bearing 186b on a bracket 189 depending from the cross member 129. Said worm gear 186 is driven by a worm 187 fast on a lower horizontal shaft 188 rotatable in another bearing 188a on said bracket 189. The inner end portion of said lower horizontal shaft 188 receives further bearing support in a vertical bracket 188b on the stationary framing and has at its end a bevel pinion 190 meshing with a like pinion 191 at the lower end of the main vertical shaft 8 for the platen cams.

Figure 4:
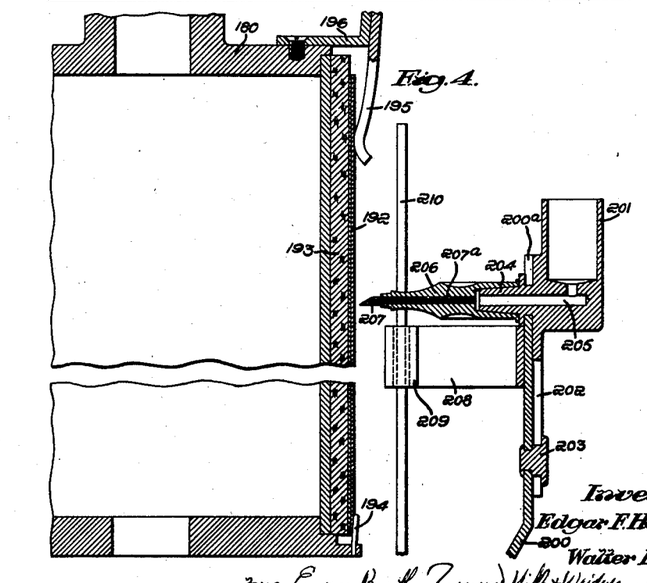
Fig. 4 is an enlarged vertical section through the recorder drum and marking device.

As seen in Fig. 1 and in detail on a larger scale in Fig. 4 the recorder drum 180 is adapted to receive a paper or other chart or sheet 192 on which the record is to be made. A typical form of chart is illustrated in the earlier application, now Patent No. 2,100,332, and need not be duplicated in detail here. The outer cylindrical face of the drum has a chart-backing surface or element 193 of a smooth, firm material but which is adapted easily to be entered by the sharp point of the marking instrument in case it pierces the paper or other material of the chart. As shown in Fig. 4 said element 193 is in the form of a cork sleeve drawn onto the drum and having a tight fit on it. The chart 192 of paper or other flexible sheet material is readily installed on and removed from the drum. In the illustrated example its lower edge is set inside one or more arcuate positioning clips 194 at the base of the drum, the overlapped end portions of the chart being brought behind one of such clips 194. At its upper edge the chart is held by a releasable clamping means such as the spring fingers 195 on brackets 196 projecting from the top of the drum 180.

Improved marking means is herein disclosed for marking the record on the chart. As seen in Figs. 1, 2 and 4 the marking device or needle is removably carried at the upper end of a vertically movable marking arm 200, the vertical movements of which are controlled by the feeler and timing control mechanism to be described. The marking device comprises a cup or reservoir 201 for a supply of ink and having depending forked portion 202 adapted to straddle a button 203 near the upper end of the marker arm 200. The upper extremity of the latter is vertically slotted as at 200a to receive a grooved portion of a nipple 204 projecting from the base of the reservoir and having an ink passage 205 communicating with the main ink chamber of the reservoir. A needle holder 206 having a needle 207 extending axially through it is received on the nipple 204, as by a Luer slip connection with it. The needle itself has a longitudinal bore or passage 207a communicating at its rear end with the channel 205 leading from the ink reservoir 201. The passage in the needle is of small or substantially capillary diameter, such as to supply and maintain a small quantity of the ink at the outer end of the needle, in readiness for marking, but avoiding any drip. The outer end of the needle preferably is sharp pointed as illustrated in Fig. 4, for indenting or piercing the chart, this action being facilitated by the readily penetrable character of the underlying cork or like element 193. It will be understood that as in the previous application the marker arm 200 and the described marking device on it normally stand at a level at the upper portion of the drum, at or near the top of the recording space on the chart, and that said parts are periodically allowed to drop, to an extent determined by the wear-measuring feeler to be described, so as to produce a mark at a corresponding level on the chart. When so moved down into marking position, the marker device is positively moved inwardly, radially of the drum, to contact and mark the chart, and is subsequently positively retracted.

For this purpose, as seen in said Figs. 1, 2 and 4, the marker-carrying arm 200 has at its upper portion a laterally projecting vertically slotted guide finger 208 which is slidable up and down, with the movement of the marker arm 200, along the adjacent edge of a vertical fin 210. The latter projects radially at the upper end of the marker-turning rod 211 which is held against vertical movement and is supported for rocking on its axis, as by means of upper and lower guide bearings 212, 213 on adjacent portions of the upper framing. A torsion spring 214 surrounding the rod 211 has one end adjustably secured to it as by a collar 215 and its other end anchored in a stationary part, such as the upper bearing 212. This spring 214 acts normally to urge the vertical rod 211 in a direction to move and hold the fin 210 and the marking needle 207 away from the chart, the tension under which the parts are so held being adjustable by means of the collar 215 referred to.

The vertical movements of the marker arm 200, and the positive inward swinging and outward retraction of the marker device by the rod 211 are effected by a linkage system of a character similar in general to that of the previous application but herein embodying various features of improvement. Referring to Figs. 1 and 2, and also to Figs. 5 to 7, the marker arm 200 is supported by upper and lower indicator or feeler arms 220 and 221 having their outer ends pivotally connected to said marker arm 200 as at 222 and 223 respectively. Intermediate its ends the upper arm 220 has a fixed point of pivotal support, as at 224, on a strap 224ª depending from the arch member 52; see Fig. 1. The lower arm 221 likewise has a fixed pivot, as at 225, on the arch or top frame. The marker needle 207 at the upper end of the marker arm 200 is thus supported for vertical movement in a straight line and in true parallelism with the vertical feeling movement of the wear indicator, detector or feeler 240 hung on the upper arm 220 in a manner to be described.

The lower arm 221 and consequently the marker device and associated parts including the wear feeler are normally held up substantially in the position as illustrated in Fig. 1 by a removable stop 226 on said lower arm 221 projecting across the upper edge of a further supporting arm 227. The latter is pivoted at one end on the same fixed pivot 225 with said lower arm 221 and has its other end pivoted as at 228 at the upper end of a link 229. Vertical movement of this link 229 serves to let down and to elevate the marker, through the medium of a lower link 230, Figs. 3, 9 and 10, having a fixed pivot at its lower end, as at 231. At an intermediate point along said lower link 230 there is pivoted as at 232 a lift rod 233 connected by a pivot at its lower end to a cam lever 234. The latter has a fixed pivot at one end, as at 234ª, Fig. 9, and at an intermediate point carries a cam roll 235 adapted to ride on a cam disc 236. The free end of said cam lever may be weighted, as at 234ᵇ.

The cam disc 236 is fixed on the shaft 188 previously referred to in connection with the drive for the recorder drum. It has a relatively short and steep-walled notch 237, Fig. 9, which, on coming opposite the cam roll 235 will allow the latter and the described linkage connections to drop sharply and cause them to be lifted again after a brief interval. This conditioning of the linkage system for down movement occurs once for each rotation of the disc 236, which has an accurately predetermined and generally relatively short period of revolution. Said linkage motion actually takes place, however, only when permitted by other control mechanism to be described in connection with Figs. 8 to 11.

Considering again the marker turning rod 211 as best seen in Figs. 1 and 2, improved means is provided for positively rocking said rod to move the marker needle 207 into contact with the chart and to retract it. These movements are respectively opposed and aided by the torsion spring 214 already described. The actuating force for the movements is derived from the lowering and lifting action of the marker arm 200 and its associated link connections, and herein directly from the lower supporting arm 227 and its connected link 229. Said arm 227 has a laterally projecting pin 227ª which in the course of the down movement of the arm is adapted to enter a slotted formation 227ᵇ at the end of one arm of a bell-crank 227ᶜ on a fixed pivot 227ᵈ on the lower arm 53 of the top frame. The other arm of said bell-crank is pivotally connected by an adjustable link 227ᵉ to lateral finger 211ª on the lower portion of the rod 211. Thus during the descent of the arm 227 its pin 227ª engages and rocks the bell-crank in a counter-clockwise direction as viewed in Fig. 1. This in turn rocks the rod 211 in a positive, firm manner, in the direction to swing the vertical fin 210 in toward the chart and to cause the needle 207 to make a mark on it. By reason of the interengagement of the pin 227ª in the slot 227ᵇ of the bell-crank a reverse turning of the latter is effected during the subsequent raising of the link 229 and arm 227. The rod 211 accordingly is reversely rocked to swing the fin 210 away from the chart, positively retracting the needle, supplementary to the influence of the spring 214.

The described linkage and cam mechanism associated with the marker arm 200, together with said further controls of Figs. 8 to 11 determines the times at which the periodic measurements and recordings shall be made, by allowing the marker mechanism and the wear detector or feeler 240 to move down at the selected intervals. The extent of this down movement is in direct ratio to the depth of wear which has been effected on the specimen at the given time, as detected or measured by the feeler element 240 which engages or feels directly on the worn surface of the specimen. Said feeler as herein disclosed is of improved construction, whereby possible irregularity in its positioning is substantially reduced, the feeler being enabled in effect to float on the specimen and to give an indication of the average height or depth of the worn area of the specimen contacted by it. Novel provisions are also herein made whereby the ratio of the markings on the chart to that of the actual distance of wear may be varied, so that the vertical extent of the curve plotted on the chart may be made greater or less, to suit different conditions. For example, with a relatively thick specimen to be tested, such as a heavy Axminster carpet the total wearing-depth and accordingly the increments to be measured are relatively large, so that a charting ratio of perhaps ten to one or even less may be adequate to plot a curve on which the successive points are adequately spaced vertically for convenient reading. With other materials, with which either the incremental or the total wear is smaller, larger charting ratios may be desirable, such, for example, as twenty to one, fifty to one or even greater.

Referring in this connection to Figs. 1, 2 and 5 to 7 inclusive, the feeler or detecting device proper comprises a flat disc, plate or caliper button 240, preferably having an inwardly and downwardly bevelled edge portion, to facilitate its seating on the specimen. In the illustrated example this feeler button has an area of approximately 1½ square inches. At its upper face is a central stem 241 terminating in a ball 242. The ball 242 is movably received in the lower end of a socket member 243 which is spun over at its bottom edge as illustrated, sufficiently to retain the ball 242 while affording to the feeler button 240 a universal or floating movement relative to the socket member, and enabling it to tilt in any diametral plane.

The socket member 243 is adjustably threaded at the lower end of the feeler rod 244 the upper end of which in turn is adjustably threaded into a top-piece or cap 245 through which the feeler is connected to the upper arm 220 of the parallel linkage system, in any one of a number of different positions relative to it. It will be seen that the universal connection between the feeler head or button 240 and its supporting rod, and which permits the feeler head to float or tilt relatively to the rod, affords a greater degree of accuracy in measuring the average depth of the portion of a test specimen onto which the feeler is let down. For example, if some small area of the specimen, less than that of the feeler head, stands at a higher level, such as a small hump or projection of any kind, the portion of the feeler head diametrically opposite such elevation will tilt down to the lower level and allow the feeler rod to come down to a level intermediate the lower one and that of the elevation. Thus in effect the feeler indicates the average level of the contacted worn surface. The feeler rod 244 as shown has a knurled head 244ᵃ fast on it to facilitate turning the rod for length-adjusting purposes, and whereby the feeler may quickly be set for co-operation with any given specimen. A knurled lock nut 244ᵇ desirably is threaded on the rod adjacent the cap piece 245 for locking said parts in the desired relative position of adjustment.

The feeler-rod supporting cap 245 has a lower forked portion 246 through which the upper linkage arm 220 extends, and an upper forked portion 247. Intermediate these two forked portions is a laterally projecting arm 248. Each of the three portions of the feeler-rod cap 245 referred to has an aperture for the reception of a removable pin 249 for use in connecting said cap 245 to the upper arm 220 in three different positions of adjustment, as shown for example in Figs. 5, 6 and 7 and which positions will hereinafter be referred to as positions A, B and C as indicated on said figures.

Figure 5:
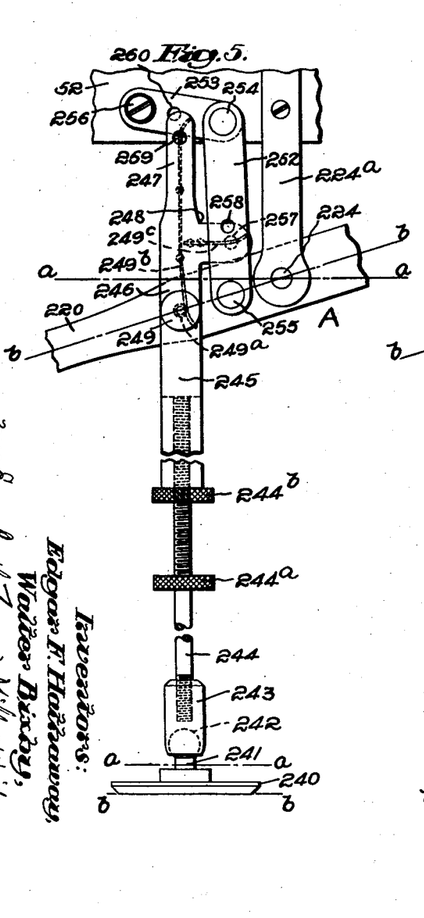
Figs. 5, 6 and 7 are elevations of the wear measuring feeler, illustrating three different positions of adjustment, giving different charting ratios.
Figure 6:
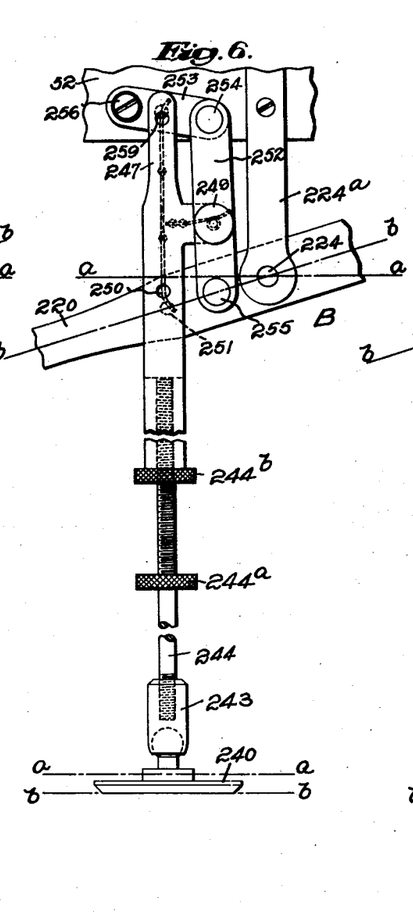
Figure 7:
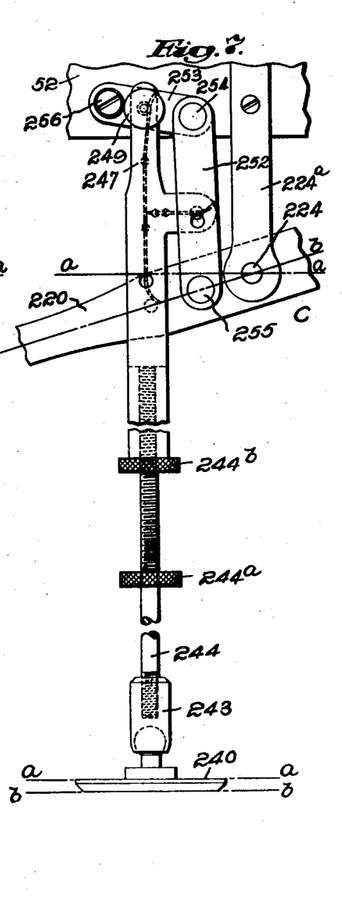

In position A, that of Fig. 5, the removable pin 249 is set in an aperture 250 in the lower slotted portion 246 of the cap 245 and through a corresponding aperture 251 in the arm 220 (these apertures may be seen unobscured by the removable button, in Figs. 6 and 7). In this A position, of Fig. 5, the cap member 245 of the feeler rod is directly connected to the arm 220 and in such manner that the ratio between the feeler movement, in traversing the total worn depth to be measured, and the corresponding movement of the marker device 207 is relatively small, that is, nearest to a direct or 1 to 1 ratio. In the example illustrated this A position of the parts affords a 10 to 1 ratio between the distance measured off and marked on the chart and the actual corresponding worn depth indicated.

In each of Figs. 5 to 7 inclusive the feeler 240 is shown in the same lowermost position, in which it is assumed to be down in contact or substantially in contact with the bare platen. This bottom level is indicated by the dot-and-dash line b—b, at the bottom of each of said figures. The initial level of the test specimen, that is, the level at which the feeler makes its uppermost marking indication is shown in the several figures by the dot-and-dash line a—a, spaced above the bottom level lines b—b. The corresponding positions of the arm 220 are indicated at the upper portions of said figures by the dot-and-longer-dash lines a—a, b—b.

From a comparison of said Figs. 5, 6 and 7 it will be noted that the initial or a—a position of the arm 220 and the final or b—b position of said arm is the same in each of the adjusted positions of the parts, but the feeler 240 starts its indications at succeeding lower levels. That is, while the total angular movement of the arm 220 is always the same, the vertical movement of the feeler 240 differs. In Fig. 5 the relatively large vertical movement of the feeler between the wear lines a—a and b—b at the bottom of the figure corresponds to a marking movement of the arm 220 through the angle between the lines a—a and b—b at the upper portion of the figure. In Fig. 6 the lesser feeler movement, between the wear lines a—a and b—b of that figure again corresponds to the same total marking movement of the arm 220 between the lines a—a and b—b adjacent it, while in Fig. 7 a still smaller feeler movement corresponds to this same total movement of the arm 220.

Or to put it conversely, and going from Fig. 7 to Fig. 6 to Fig. 5 the same incremental movement of the feeler 240 effects a proportionately decreasing corresponding angular movement of the arm 220. Thus with the C-setting as in Fig. 7 a relatively minute movement of the feeler, say of the order of .002 inch is enabled to effect markings on the chart spaced say .1 inch (i. e. 1 to 50) and hence at adequately spaced points for clear reading purposes. The resulting markings may if desired be substantially as widely spaced vertically with said C-setting as with the small ratio or more nearly direct A-setting, (1 to 10 for example) the B-setting affording an intermediate ratio, such as 1 to 20. The horizontal graph lines on a given chart, indicative of wear levels, when used in the three different A, B and C settings of the feeler, might represent actual increments of wear of the specimen such, for example, as .010 inch, .005 inch and .002 inch for said three cases.

It will be understood that by "feeler movement" as here referred to in connection with the lower lines a—a and b—b is meant the increasing distance to which the feeler descends at succeeding time intervals as the wear deepens during any given test specimen, it being further noted that, as in the preceding application, the feeler normally is elevated, substantially as in Figs. 1 and 2, above and out of contact with the specimen and in making each periodic measurement it may have a preliminary down movement before contacting the surface of the specimen. The extent of this preliminary movement varies with specimens of different thickness and with the corresponding different adjusted positions A, B and C of Figs. 5 to 7. This is compensated for by adjusting the length of the rod 244 below the top-piece or cap 245 as permitted by the threaded adjustable connection between said parts. In comparing these three figures it will be noted that the feeler-rod length below the cap 245 is greater in Fig. 6 than in Fig. 5 and still greater in Fig. 7.

The mechanism by which the different adjusted positions B and C of Figs. 6 and 7 respectively are obtained comprises two links 252 and 253 having their adjacent ends pivotally connected as at 254. The vertical and longer links 252 is pivoted at its lower end to the arm 220 at 255 while the shorter and more nearly horizontal link 253 is pivotally hung on the upper frame member 52 as at 256.

The lateral finger 248 of the cap 245 has a pin-receiving aperture 257 adapted to cooperate with a similar aperture 258 in the vertical link 252. Similarly the upper slotted portion 247 of said cap piece has a pin-receiving aperture 259 for cooperation with an aperture 260 in the upper link 253.

For the setting B, of Fig. 6, the pin 249 is removed from its position as shown in Fig. 5 and is inserted in the apertures 257, 258 of the lateral finger 248 and the link 252, the parts being manipulated to bring said apertures into alignment. In this B position the connection between the feeler rod 244 accordingly is through the lower portion of the cap member 245, through the lateral finger 248 thereon and thence through the lower portion of the link 252 onto the arm 220 at the pivot point 255.

For the C position, of Fig. 7, the parts are manipulated to bring the aperture 259 at the upper end of the cap 245 into alignment with the aperture 260 of the horizontal link 253 and the pin 249 is then inserted in said aligned apertures. As seen in Fig. 7 the connection from the feeler rod 244 is then up through substantially the full length of the cap 245, through the outer end portion of the link 253 and downwardly through the full length of the vertical link 252 onto the arm 220 at the pivot point 255.

Releasable means desirably is provided for holding the pin 249 in its several different adjusted positions. In the illustrated example this is effected by an annular slot 249ᵃ in the neck of the pin 249 and adapted to have locking engagement with wire-like spring fingers 249ᵇ and 249ᶜ fixed on the cap member 245. Said spring element 249ᵇ is vertically extended to have locking cooperation with the pin 249 when the latter is either in the lower aperture 250 or in the upper aperture 259, as seen in Figs. 5 and 7, while the intermediately located finger 249ᶜ is positioned to snap into said locking slot 249ᵃ of the pin when the latter is in the intermediate aperture 257 of the laterally projecting finger 248, as seen in Fig. 6.

It is desirable that the feeler button 240 shall engage the test specimen with a predetermined and adjustable pressure, and also that the same predetermined pressure be maintained when using the different calibrations or marking ratios corresponding to the positions A, B and C referred to. Accordingly, as seen in Fig. 1, the upper arm 220 is accurately balanced or loaded to the extent necessary for said purpose, as by means of a balance adjuster slide 220ᵃ movable received on said arm and retained at various points along it as by the spring ball detent shown or other like device cooperable with notches or the like formations on the arm. A stop may be provided to retain the slide against running off at the free end of the arm 220. The latter may additionally be apertured at its free end for hooking on various weights if greater pressure by the feeler is desired. The adjuster slide may have a pointer element such as illustrated, for cooperation with a scale along the arm 220 graduated in units of feeler pressure or loading. The appropriate setting for the balance slide 220ᵃ to give a same predetermined feeler pressure for the three ratio settings A, B and C may be distinctively marked on the arm 220 as indicated by the letters A, B and C on Fig. 1.

As seen in Fig. 2 the feeler rod 244 is additionally guided in its up and down movements as by a guide arm 260 depending from the lower arm 53 of the top arch or frame. As previously mentioned the dirt-retaining glass plate 119 is apertured for passage of the feeler rod.

From the foregoing it will be understood that the described feeler and the associated marking device, the marking level of which is controlled by the feeler, are permitted to descend periodically to take a wear measurement and making a recording thereof. As previously mentioned, means is herein provided whereby the times at which such measurement and recording are had may be selected so as to occur relatively frequently, or only at longer intervals. With some types of material to be tested it is also desirable that wear measurements and recordings should be made at compartively frequent intervals during the initial portion of the test but thereafter only at longer intervals. For example, with Axminster rugs and other tufted or pile fabrics, in the earlier stages of the test the indicated wear or thinning of the specimen is comparatively rapid, the pile being matted or worn down to a certain initial extent comparatively quickly but thereafter wearing down much less rapidly. That is, the wear curve plotted on the chart descends very steeply at first and then levels off. Hence if the readings for the opening stage of the test should be taken only at the longer intervals appropriate for the latter stages, the first markings on the chart would be comparatively widely spaced vertically. To fill in such a gap with one or more intermediate markings an initial short-interval measurement and recording is herein made possible.

Figures 8, 9:
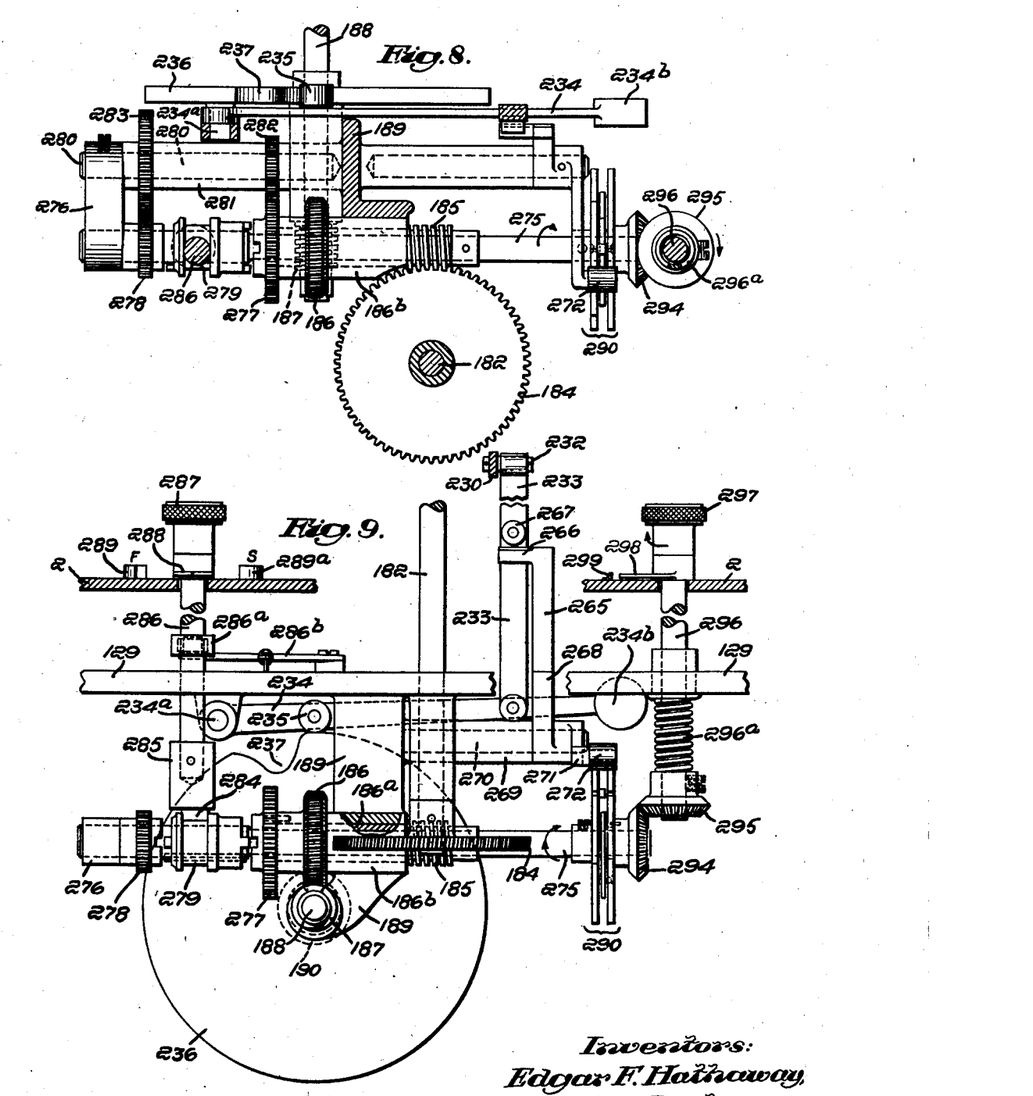
Fig. 8 is a view partly in plan and partly in horizontal section of a portion of the mechanism of Fig. 3, on a larger scale.
Fig. 9 is a view, mainly in elevation, of the mechanism of Fig. 8 seen as if looking at Fig. 8 from a position facing toward the top of the sheet.

Referring now to Fig. 3 and to the detail Figs. 8 to 11 inclusive, the vertical link 233 and the arm 234 carrying the roll 235 which cooperates with the cam disc 236 are normally held up in raised position as seen in Figs. 3 and 9, wherein the feeler and the marker are likewise elevated, by means of a finger 265 having a dog 266 at its upper end engaging beneath a boss 267 on said link 233. The main upper portion of the arm 265 as illustrated is of spring material, so that in certain positions of the parts the arm may spring back away from the link 233 and permit the latter to rise past the dog 266 and into the illustrated position of Figs. 3 and 9.

Said spring portion 265 is fastened to a short arm 268 on a sleeve 269 rotatably supported on a stud 270 projecting from an adjacent fixed part of the lower framing. Said sleeve 269 also has secured to it, in the manner of a bell-crank, a lower arm 271 carrying a roll 272 cooperating with a set of interval-controlling elements or discs by adjustment of which the initial short-interval and subsequent long-interval measurements or readings may be had.

This adjustable control unit, indicated as a whole by the numeral 290 and to be referred to in more detail later, is mounted on one end of the horizontal shaft 275 previously referred to as having the worm 185 fast on it. Said shaft continues loosely through the bearing bushing 186ᵃ for the worm gear 186 and axially beyond the latter, to receive end bearing support in a bracket 276, Figs. 8 and 9. Also loose on said shaft 275 is a large gear 277 fast with the hub of said worm gear 186. Spaced from said gear 277 and also loose on the shaft 275, adjacent its end in the bearing 276, is a smaller gear 278. These gears are suitably held in spaced relation on the shaft 275 and their hubs, at their adjacent faces, are provided with clutch formations for engagement with a clutch sleeve 279 keyed on the shaft 275 for rotation with it but slidable thereon for alternative engagement with the small gear 278 or the large gear 277 thereby selectively to couple either of the latter to the shaft 275.

As seen in Fig. 8 a short stud shaft 280 is provided adjacent and paralleling the shaft 275 and having its inner end fast in a boss supported from the bracket 189 before mentioned. The bearing bracket 276 shortly above referred to is secured as by a set screw to the outer end of this parallel stud shaft 280. Rotatable on said stud shaft is a sleeve 281 having secured at one end a small gear 282 meshing with the large gear 277 on the hub of the worm gear 186, said sleeve having at its other end a larger gear 283 having meshing engagement with the smaller gear 278 loose on the shaft 275. The described gearing constitutes a change-speed mechanism whereby the shaft 275 and hence also the record drum 180 on the recorder shaft 182 may be connected in driven relation with the worm gear 186 at either of two speeds.

By shifting the clutch collar 279 toward the right in Fig. 9 the worm gear 186 is directly coupled through its hub and that of the adjacent large gear 277 to the shaft 275. By sihfting the clutch sleeve 279 toward the left in Fig. 9 the smaller gear 278 is coupled to the shaft 275. The drive is then from the worm gear 186 and the coaxial large gear 277 to the smaller gear 282 on the sleeve 281 and through the larger gear 283 also on said sleeve, to said smaller gear 278 and hence to the shaft 275 then coupled to the hub of said gear 278. It will be noted that with the parts connected as last described, that is, with the small gear 278 coupled to the shaft 275 by shifting of the clutch sleeve to the left in Figs. 8 and 9, the shaft 275 is driven at a higher speed, through the described step-up gearing arrangement, as contrasted with the slower or 1 to 1 drive ratio between the worm gear 186 and the shaft 275 when said worm gear is in effect coupled directly to said shaft, by throwing the clutch sleeve 279 to the right in said Figs. 8 and 9.

As will be apparent from the further description the described driving of the shaft 275 at the higher speed is adapted to effect measurements and recordings at regular but relatively short or frequent intervals, say for example every five minutes, while at its slower rate of drive the regular measurements and recordings are had at greater intervals such for example as every twenty minutes. The long intervals and the short intervals may be otherwise proportioned, as determined by the ratio of the gearing 277, 282, 283 and 278 in the change-gearing described. It should also be noted that such shifting of the speed of shaft 275 produces the same proportionate change in the drive of the recorder drum 180, since the latter is driven from the worm 185 fast on said shaft 275 and meshing with the worm wheel 184 on the recorder shaft 182. Such corresponding change in the drum speed and hence of the angular travel of the chart 192 thereon is desirable so as to produce a wider horizontal or peripheral spacing between successive short-interval markings, preferably to the same extent as for the longer-interval markings.

Means conveniently available to the operator or person conducting the tests is provided for shifting the clutch sleeve or coupler 279 into and to retain it in either of the described positions. For this purpose, as illustrated in Figs. 8 and 9, said clutch sleeve has a circumferential slot receiving an eccentric 284 on a collar 285 pinned at the lower end of a time-shift rod 286 guided in the lower framing and extending upwardly through the platform 2. This shift rod has a manipulating button or knob 287 at its upper end, and also a pointer 288 for visually informing the operator as to the position of the clutch sleeve 279, that is, as to whether the apparatus is set for fast, short-interval readings or to read at the slower, longer intervals. Since the clutch and associated parts, in fact all the operating mechanism, is housed in the cabinet 1, the operator might otherwise have difficulty in quickly determining the operating status of the machine. Said pointer is movable between appropriately located stops or indices 289, 289ᵃ corresponding to the two clutch settings respectively. Appropriate indicia may be provided adjacent said stops such as F and S for fast and slow, or "5-minute" and "20-minute" respectively, or such other intervals as may be used in the given instance.

It will be understood that the clutch sleeve 279 is at all times, during operation of the machine, in one or the other of its engaged positions, its intermediate or central position as shown in Figs 8 and 9 being only momentary, it being assumed for the purpose of said figures that the clutch sleeve is in the process of being thrown in one directiton or the other, by manipulation of the knob 287. Means desirably is provided, for throwing the clutch sleeve into and holding it in its two positions. As represented for example in Fig. 9 the shift rod 286 has fast on it a bevelled end dog 286ᵃ engaged by a spring-actuated camming arm 286ᵇ mounted so as to be toward the end of the dog. As the latter moves past center said arm snaps onto one or the other of the inclined ends of the dog, camming it angularly about the axis of the rod 286 and thereby moving and holding the latter and the clutch sleeve in the selected position of adjustment.

Rotation of the shaft 275, in the directiton of the arrow thereon near its right end in Figs. 8 and 9 not only actuates the recorder drum but also operates through the control disc or plate unit 290 previously mentioned to exercise a master control as to the time a measurement is to be made. Appropriate positioning of said unit 290 allows the associated roll 272 and arm 271 carrying it to drop, thereby to turn the sleeve 269 so as to withdraw the spring arm 265 from its normal position below the boss 267 in which it prevents descent of the link 233 even though such descent might be permitted by the cam disc 236 and its cooperating cam roll 235.

This time-controlling unit 290 includes a plural-notched short-time plate 291 fast on the shaft 275, its hub 291ˣ being secured thereto as by a set screw or the like. This plate 291, hereinafter referred to as the initial-period or "5-minute" plate acts in a controlling capacity only for effecting a comparatively small number of relatively closely timed and usually initial readings. At other times it acts simply as a driver for the other main parts of this unit 290. Loose on the shaft 275, adjacent the initial-period plate 291 is a semi-circular coupling plate or coupler 292. Beyond the latter and also loose on the shaft is a further plate 293, hereinafter referred to as the normal-control or normal-period plate. This latter has but a single notch 293ᵃ for entrance of the roll 272.

When the machine is being operated to give readings or recorded measurements at regular intervals, whether these intervals be short or long, the time at which a measurement shall occur is determined by the dropping of the roll 272 into the notch 293ª of this normal-period plate 293. Although the roll is of a length to extend across both plates 291 and 293 one of the notches of the first plate 291 normally is always in line with said single notch 293ª of the normal-control plate 293. Under such conditions the measuring interval is further determined merely by the speed of the shaft 275 as controlled by the positioning of the clutch member 279, the shift or control knob 287 being set for fast or slow marking as desired. The marking intervals under such "normal" operation, whether short or long, are in either case equal or regular.

The normal-period plate 293, while loose on the shaft 275, is secured to the hub of a bevel pinion 294, Figs. 3, 8 and 9 which also is loose on said shaft. This pinion 294 meshes with a similar bevelled pinion 295 fast at the lower end of a vertical indicator rod 296 journaled in the lower framing and extended upward through the platform 2, similarly as the clutch rod 286. At its upper end is manipulating knob 297 and an indicating pointer 298. Adjacent the outer end of the pointer is an index 299 so positioned with relation to the described parts that the arrival of the pointer 298 opposite it will afford a visual indication that a measuring and recording operation is in process or about to take place. By noting the positon of the indicator 298 relative to the index 299 at any time, the progress of the measuring interval may be observed, whether the mechanism be set for short time or long time measurement. For example, under a 20 minute setting, if the pointer is diametrically opposite the index 299, this shows that the marking interval is half over. The same is true for a five minute or other setting.

The two plate elements 291 and 293 of the control unit 290 are adapted to be variously connected in driving or non-driving relation through the intermediate plate or coupler 292 and through a pin 291ᵇ at the inner face of the initial-period plate 291 and a pin 293ᵇ on the adjacent inner face of the normal-interval plate 293. These two pins are located at different radial distances from the axis of the shaft 275 so that at certain times they may pass each other. They are also positioned for overlapping engagement with one or the other radial edges or end faces 292ª and 292ᵇ of the coupler 292, in the various different positions of the parts now to be explained.

Figure 11:
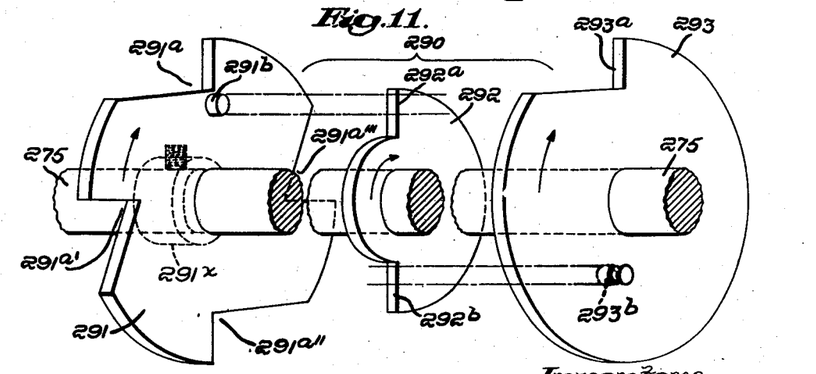
Fig. 11 is an exploded view of a timing unit seen in Figs. 8 to 10.

When the mechanism is set for "normal" operation, that is, to take readings at equal time intervals from the start of the test and continued throughout, and irrespective of whether the setting, as controlled by the shift-clutch 279, is for the shorter intervals or the longer ones, the position of the three elements 291, 292 and 293 of the control unit 290, at the time for each reading, is that illustrated in the partly diagrammatic or exploded view, Fig. 11. At such time the notch 291ª of the disc 291, the notch nearest the pin 291ᵇ on said disc, is at the top, in position to allow the roll 272 and its carrying arm to drop. So also is the notch 293ª of the other disc 293. These two notches thus being aligned, the roll 272 drops, releases the link 233. Since the notch 237 of the cam or master disc 236 is arranged also then to be at the top, opposite the cam roll 235, the feeler and marker mechanism descends and effects a measurement and marking.

In the described position of the three parts of the unit 290 they all revolve as one, the first disc 291 driving the connector disc 292, in the clockwise direction as indicated by the arrows in Fig. 11 and the latter in turn driving the second disc 293. A spring 296ª surrounding the indicator and setting shaft 296 and bearing downwardly on the pinion 295 puts sufficient load on the latter to hold the disc 293 and connector plate 292 against overrunning and keeping the pin 293ᵇ in engagement with the connector plate at its radial face 292ᵇ, and the radial face 292ª of said plate in abutting relation with the pin 291ᵇ of the first disc.

Assume now that it is desired to have the readings occur at certain regular intervals throughout the major portion of the test, say 20-minute intervals, but to have them made more frequently during the first 20-minute interval, or for that matter during some subsequent regular interval. In other words, it is desired to sub-divide the initial or other regular interval into an equal number of shorter intervals. With a short-interval or sub-dividing disc 291 having four notches as illustrated in Fig. 11 the division is into four equal shorter intervals; for subdividing into some other number of shorter intervals a corresponding number of notches would be provided.

This subdividing of the regular marking interval, either at the start of a test or at some subsequent time, is effected by turning the setting knob 297 at the upper end of the indicator and setting shaft 296 ahead, in the same direction on which it is rotated by the shaft 275, as indicated by the arrow adjacent said knob 297 in Fig. 9, and by the other rotational arrows in said figure and in Figs. 8 and 11. The shaft 296 is so turned until it has advanced the single-notch disc 293 through 360° relative to the shaft 275 on which said disc and the connector plate 292 are loosely mounted. It will be observed that the pin 293ᵇ on said disc 293 is at the bottom of the latter in the normal position thereof as shown in Fig. 11, said pin being diametrically opposite the notch 293ª.

The first 180° or half-turn advance of the disc 293 shifts pin 293ᵇ to a top position, bringing it up against the then upper radial face 292ª of the connector plate 292. Continued advancing of the disc 293 in the manner referred to then causes said pin 293ᵇ to pick up the connector plate 292 and advance it with the disc 293 through the second 180° or half turn of the latter. This accordingly brings the connector plate 292 round to a diametrically opposite position from that of Fig. 11, so that its radial face 292ᵇ is brought to the top but behind the pin 291ᵇ of the plural-notch disc 291, and the other radial face 292ª is carried down to the bottom, away from and 180° in advance of said pin 291ᵇ.

With the parts of the unit 290 so disposed and the apparatus being started up or continued in operation, the first wear measurement and marking will take place when the disc 291 has made a quarter-turn, bringing its next notch 291ª′ to the top. The releasing roll 272, which is of a length to extend across both discs 291 and 293, as seen in Figs. 8 and 9, can then drop because the disc 293 has not been turned during this quarter-turn of the shaft 275 and disc 291. This is so because the radial faces 292ª and 292ᵇ of the connector plate initially stood 180° ahead of the pins 291ᵇ and 293ᵇ respectively. During this first quarter-turn the pin 291ᵇ moves down clockwise, Fig. 11, through 90° of arc, but is still 90° away from the radial face 292ᵃ of the connector plate.

After this first short-interval marking, resulting from the notch 291ᵃ' coming to the top, the plural-notch disc 291 continues another quarter-turn, bringing the next notch 291ᵃ'' to the top. As the connector plate 292 has not yet been turned the disc 293 has continued in its position of Fig. 11, so that its slot 293ᵃ remains at the top and aligns with said second notch 291ᵃ'' of the disc 291. Another measurement and recording accordingly takes place. At this time the pin 291ᵇ has advanced 180°, to a bottom position, in which it brings up against the radial face 292ᵃ of the connector plate 292.

Another quarter-turn of the shaft 275 and disc 291 accordingly causes the latter to pick up the connector plate and move it 90° to a position in which its radial faces are horizontal, face 292ᵃ being at the left, looking at Fig. 11, and directly above the pin 291ᵇ (which has now advanced 270° from its initial or Fig. 11 position) and face 292ᵇ being horizontal but still 90° behind the pin 293ᵇ of the single-notch disc 293. The latter accordingly still has not been turned, its notch remains at the top in position to align with the notch 291ᵃ''' of disc 291, and the third short-interval marking takes place.

During the next-following or fourth quarter turn of the shaft 275 and plural-notch disc 291 the three main parts 291, 292 and 293 of this unit 290 arrive again in the relative positions as shown in Fig. 11, the connector plate 292 being carried around another quarter turn, to its illustrated position, bringing its radial face 292ᵇ into abutting position behind the pin 293ᵇ of the single-notch disc 293. The pin 291ᵇ of the plural-notch disc 291 has likewise returned to abutting position behind the radial face 291ᵃ of the connector plate. The single-notch disc 293 still has not been turned and accordingly, as the notch 291ᵃ of the plural-notch disc 291 comes to the top a fourth short-interval measurement and marking takes place.

Since the parts have now arrived at the position in which they turn as a unit, being driven from the shaft 275 through the disc 291, the connector 292 and onto the single-notch disc 293, a measurement will thereafter have been had only for each revolution of said single-notch disc 293, as its notch 293 comes to the top, at such longer but regular intervals as represented by a single revolution of said part 293.

For example, if the gearing ratio is such that under a "slow" or "long-interval" setting of the shift knob 287 and clutch 279 the shaft 275 and disc unit 290 is revolved once each twenty minutes, then a reading will be made regularly at 20-minute intervals, and the four sub-divided or short-interval readings as above described occurred at 5-minute intervals, the first at the end of five minutes, the second at ten minutes, the third at fifteen minutes and the fourth at twenty minutes, with regular readings thereafter only at the longer 20-minute intervals. It will be understood that if the shift-knob 287 and the clutch 279 controlled by it are moved to their "fast" or shorter-internal setting wherein the shaft 275 is driven at a greater speed, so that the regular marking intervals are cut down to say five minutes, then such quicker or 5-minute intervals may similarly be sub-divided, into four still shorter intervals in the illustrated instance, by adjustment of the control-unit 290 through advancing the setting knob 297 as described. Such sub-divided readings would then occur at one-and-one half minute intervals, during the initial or other regular interval, whenever said adjustment is made.

To summarize, the measurement time control mechanism as disclosed is such as to effect regular short-interval readings (that is, wear measurements and recordings) at say 5-minute intervals, or alternatively regular long-interval readings, at say 20-minute intervals. This selection is made by the shift-knob or selector 287 by means of which the clutch member 279 is thrown to couple the shaft 275 for "low-speed" or "high-speed" operation. The ratio between said short and long intervals depends on the ratio of the described change-speed gearing, which may be other than the 1 to 4 ratio mentioned by way of example. In addition, the control mechanism may be adjusted, by manipulation of the setting knob 297, to sub-divide any regular reading interval into a number of shorter ones, such sub-division being into four shorter intervals in the illustrated mechanism shown by way of example. Other fractional interval or subdivided reading periods may be had by providing a different number of notches, whether two, three, six or other number, in the plural-notch disc 291. Accordingly, for example, the machine may be set to give readings at five, ten, fifteen and twenty minutes from the start of a test and thereafter at the end of each twenty minutes. Or, using the "fast" or short-interval regular readings, it may be set to read initially at one and one-quarter minutes, two and one-half minutes, three and three-quarter minutes, and five minutes from the start of a test and thereafter at the end of each five minutes. Any subsequent regular marking interval, whether short or long, may be similarly subdivided. It will be understood that the specific time intervals mentioned, such as 5-minutes, or 20-minutes, while found to be convenient periods for wear curve plotting by markings on the chart, are given as examples only, and that other intervals, either shorter or longer, may be employed, depending on the ratios of the described drive and gearing mechanism.

It will also be noted that, as in the earlier, patented application, there is a very large reduction in the drive of the recorder drum shaft 182, first through the small and large gears 12 and 11 of Fig. 3 and subsequently through three successive worm and worm gear pairs, namely the pair 10, 9, the pair 187, 186 and finally the pair 185, 184. The recorder drum accordingly turns slowly, for example, once each 24, 36 or 48 hours, or some similar period, so that the one chart may cover such total period. For longer tests, which may extend up to 72 hours or more, larger diametered drums may be used, accommodating a longer chart, or the drive ratio for the drum may be altered to condense the plotted curve circumferentially of the drum.

On Fig. 1 several elements not previously referred to are shown. These include the lifter hook 300 hung on a short arm 301 on a collar, at the opposite face of the arch from that seen in Fig. 1, on a pivot 302 and connected to a hand lever 303. The hook is adapted to engage under an extension of the pivot 123 of the shoe lifter arm and, by rearward swinging of the hand lever to elevate the shoe and hold it up off the platen. In such raised position the short arm 301 throws up a cross center so as to hold the hook up, said arm being stopped in said holding position by engagement of the lever 303 with a stop 304 on the upright 55.

The up and down, impacting action of the wearer shoe may be dispensed with if so desired. In order so to discontinue the impacting action the removable pivot pin—connecting the lift rod 124 and its operating lever—is withdrawn, rendering the lifter mechanism inactive. Thus, as may be desired for various different materials to be tested, the wearing action on the specimen may be continuous and without impact, or may be intermittent, for example, thirty-eight engagements per minute, and with impact. Moreover, by means of the micrometer adjustment device 132—136 the shoe may be set to operate at any desired level relative to the specimen, and such operation may be with impact or without impact, and either continuous or intermittent, in either instance. Moreover, by means of the adjustable weight 130 the pressure of the shoe on the specimen may be regulated as desired. For example, in one embodiment the weight of the shoe, having 5½ square inches of wearing surface area and its shaft and immediately associated parts, is about 12 lbs. With the other operating parts such shoe, with no additional weight at 130 places a total weight on the platen of 30.12 lbs. or 5.48 lbs. per square inch. By reason of the leverage involved the addition of a 10 lb. weight at 130 places a total weight on the platen of 55.22 lbs. or 10 lbs. to the square inch. A 20 lb. weight brings the total weight on the platen to 80.32 lbs. or 14.7 lbs. per square inch, while a 30 lb. weight places a total weight of 105.42 lbs. on the platen, or 19.2 lbs. to the square inch. Other desired pressures may be had by adding to or subtracting from the weight 130.

Referring to the upper right portion of Fig. 1 a stop motion as there shown is associated with the feeler measuring mechanism and is adjustable so as automatically to stop the machine at any desired depth of wear of the specimen. Said stop devices include a contact finger 310 having a threaded upper portion whereby it is supported with capacity for vertical adjustment in an arm 311 mounted on a stud 312 projecting from the arch member 54 and insulated from it as by a non-conducting bushing. The contact finger has an adjusting head 314 at its upper end and a lock nut 315 for securing it in adjusted position. Said finger is adapted to engage and make electrical contact with the free end of the upper arm 220 of the feeler linkage system, thereby to establish a motor-stopping circuit. Raising of said arm being proportional to the down movement of the feeler, the contract finger may be set to stop the machine at any detecting position of the feeler. It will be understood that said arm 220 is electrically grounded on the machine, and the circuit, preferably of low voltage, is through a conductor connected to the stud 312 and insulated from the machine and its framing.

Herein on the same stud 312 there is hung a strap 320, in electrical contact with the stud but insulated from the machine. At its lower end this strap has a foot 321, Fig. 1, carrying a vertically adjustable threaded contact point or screw 322. Said contact 322 stands below the lifter arm 98 for the wearer shoe and is adapted to have motor-stopping contact with the latter at any desired level of the shoe during the wearing of a specimen. This contact accordingly may be set to stop the machine either when or just before the specimen is completely worn through or at any other selected height of the latter. The two described stop motions in effect afford a check one on the other.

The main starting and stopping switch buttons for the machine may be positioned at any convenient point. At the lower left portion of Fig. 2 a switch unit 325 is shown mounted in the edge of the platform 2, and including "on" and "off" buttons 326 and 327 respectively.

Our invention is not limited to the particular embodiments thereof herein illustrated or described, its scope being pointed out in the following claims:

1. Wear measuring and recording mechanism for sheet-material wear-testing apparatus, said mechanism comprising a rotary drum, means to turn the drum predeterminedly during a wearing operation, a recording chart to be marked periodically along points determinative of a wear curve, means for holding the chart in recording position on the drum, feeler mechanism periodically to measure the wear upon a sheet-material test specimen, a marking device adjacent the drum and chart, operating means for the feeler mechanism, and connections between said operating means and the marking device whereby the latter is caused to mark the chart when the feeler mechanism makes a wear measurement.

2. Mechanism for measuring and recording the extent of wear of a sheet-material test specimen disposed flatwise horizontally and subjected to progressive wearing action, comprising, in combination, a feeler movable vertically to and from contact with the wearing area of the specimen, a recording chart, a device for periodically marking on the chart, a system of parallel linkage connecting and supporting the feeler and marking device for straight-line vertical movement in parallelism, cam means to elevate and periodically to let down the feeler onto the specimen to measure its wear and correspondingly to position the marking device relative to the chart, the marking device including a pointed element movable toward and from the surface of the chart, and associated means for moving said pointed element to cause it to mark the chart according to each measuring action of the feeler.

3. Mechanism for measuring the extent of wear of a sheet-material test specimen subjected to progressive wearing action, comprising, in combination, a feeler including a rod guided for longitudinal movement toward and from the worn area of the specimen, an elongated arm having a fixed pivot to one side of the feeler rod and pivotally supporting the latter, a marker rod having an intermediate portion pivoted to said arm, at the other side of the feeler rod, a link having one end pivotally connected at one end of said marker rod and its other end rockably supported on a fixed pivot, said feeler rod, arm, marker rod and link forming a system of parallel linkage in which the feeler and the free end of the marker rod are adapted for parallel straight-line movement, means at the free end of the marker rod for marking a movable chart, a control element engageable with the linkage system, cam means normally positioning said control element and linkage system with the feeler away from the test specimen but periodically releasing said system to afford a measuring action for the feeler and correspondingly to position the marking means, and other connections between said control element and the marking means to effect a marking action of the latter attendant on the measuring action of the feeler.

4. Wear measuring and recording mechanism for sheet-material wear-testing apparatus, comprising means presenting a recording surface, an inking needle for marking thereon, a vertically movable feeler to measure the extent of wear by its down movement into contact with the worn area of a test specimen, a linkage system connecting the marking needle and feeler for parallel movement to proportionate extents, cam-controlled means acting on the linkage system normally to elevate the feeler and periodically allowing it to drop to measure the wear, and mechanism associated with said cam-controlled means positively to engage the marking needle with the recording surface upon each measuring action of the feeler and positively to retract it on return elevation of the feeler by said cam-controlled means.

5. In wear measuring mechanism for sheet-material wear-testing apparatus, a feeler positioned to be let down onto and to be withdrawn from the worn area of a test specimen, a pivoted linkage system connected at one end to the feeler, a lift rod connected at the other end of said system, an actuating cam cooperable with the lift rod so as normally to elevate the latter and the feeler but periodically conditioning them for down measuring movement, a movable finger engageable with the lift rod to hold it up irrespective of the position of said actuating cam, and other cam means periodically disengaging said movable finger from the lift rod to permit a down measuring movement of the latter and the feeler at selected times when they are conditioned therefor by the actuating cam.

6. In wear measuring mechanism according to claim 5, a construction wherein the cam means for acting on the movable finger supporting the lift-rod comprises relatively adjustable cam members and means for varying the relative setting thereof to change the time intervals between measuring movements of the lift-rod and feeler.

7. Wear measuring means for a wear-testing machine for sheet material wherein a specimen is presented on a horizontally disposed specimen holder where it is engaged by a wearing implement, said measuring means comprising a caliper button vertically movably supported above the specimen and normally out of contact with it, means periodically to release and drop said button by gravity into direct contacting engagement with a test area of the specimen to be subjected to wear of progressive depth, and a low-friction universal connection between the button and its support adapting the button to rest on the specimen under the influence of gravity and freely to adjust itself angularly to the contacted underlying surface of the specimen so as to indicate the average height of the contacted area.

8. Wear measuring means for a wear-testing machine for sheet material wherein a specimen is held on a horizontal platen and is acted on by a wearer element engaging the specimen flatwise, said means comprising a feeler rod mounted for longitudinal vertical movement toward and from the specimen, a disk-like feeler head at the end of the rod adjacent the specimen and having a smooth flat uninterrupted underface, the rod adapted normally to support the feeler head above and out of contact with the specimen and to be released at times to rest on the specimen freely under the influence of gravity, and universal-motion connecting means between the rod and feeler head centrally of the latter enabling the head to tilt upon any diameter thereof as an axis so as automatically to adjust itself by gravity to a contacting position on the specimen significant of the average elevation of the contacted area.

9. In wear measuring and recording mechanism for sheet-material wear-testing apparatus, a feeler including a flat member to rest on the test specimen and a supporting rod carrying said member at its lower end, means to mark a recording surface, a system of parallel linkage operatively connecting the feeler rod and said marking means for proportionate parallel movement, said system including an elongated arm vertically movable about a fixed pivot at the side of the feeler opposite the marking means, a removable pin selectively positionable at a plurality of points at the upper portion of the feeler rod, said arm having an aperture for directly receiving said pin in one position thereof on the feeler rod thereby to connect the feeler and arm to afford a given ratio of movement of the marking means relative to the feeler, and a link pivoted to the arm and apertured to receive said pin in another position thereof on the feeler rod to connect the feeler and arm for a different movement ratio of the marking means and feeler, correspondingly to alter the ratio of calibration between the worn increments measured and the indications thereof on the recording surface.

10. In wear measuring and recording mechanism for sheet-material wear-testing apparatus, a feeler movable perpendicularly to and from contact with the wearing surface of a test specimen to detect the extent of the wear, a marking device movable over a recording surface to indicate thereon the various contact positions of the feeler, an elongated arm having pivotal connection at one end with the marking device and having a fixed pivot at a portion remote from said end, and means for pivotally interconnecting the feeler and said arm at a portion of the latter adjacent its fixed pivot and between the latter and the marking device, whereby a given movement of the feeler affords a directly proportionate augmented movement of the marking device.

11. Wear measuring and recording mechanism according to claim 10 wherein the pivotal interconnecting means for the feeler and arm comprises a removable pin and a plurality of different receiving formations therefor on the feeler and the arm whereby their interconnection may be varied to afford different angular movement of the arm for a given lineal movement of the feeler, to vary the ratio of movement of the feeler and the marking device.

12. In wear measuring and recording mechanism for sheet-material wear-testing apparatus, a feeler movable perpendicularly to and from contact with the wearing surface of a test specimen to detect the extent of the wear, a marking device movable over a recording surface to indicate thereon the various contact positions of the feeler, an elongated arm having pivotal connection at one end with the marking device and having a fixed pivot at a portion remote from said end, means for pivotally interconnecting the feeler and said arm selectively to obtain one or another of a plurality of movement ratios of the feeler and the marking device, and means for adjusting the initial position of the feeler to conform to the initial plane of contact thereof with a given test specimen.

13. Wear measuring and recording mechanism for sheet-material wear-testing apparatus, comprising, in combination, a feeler adapted for movement to and from contact with the wearing surface of a test specimen to measure the extent of wear, a marking device movable over a recording surface, connections between the feeler and the marking device to move the latter proportionately to the measuring movement of the feeler, cam control mechanism normally maintaining the feeler out of contact with the specimen and periodically releasing it for a measuring action thereby, drive means for said feeler control mechanism, a rotary drum presenting said recording surface for the marking device, means to drive the drum at a constant speed, said feeler control drive means and drum drive means having a common rotary element, and change-speed gearing to vary the speed of said common element thereby to increase or to decrease the frequency of the mesuring actions of the feeler and correspondingly to increase or decrease the speed of the recorder drum.

14. Wear measuring and recording mechanism according to claim 13 including in combination therewith means additionally to vary the feeler control mechanism to subdivide a given measuring and marking interval into a number of shorter intervals and to effect measurements and recordings at such shorter intervals.

15. Wear measuring and recording mechanism for sheet-material wear-testing apparatus, comprising, in combination, a feeler adapted for movement to and from contact with the wearing surface of a test specimen to measure the extent of wear, a marking device movable over a recording surface, connections between the feeler and the marking device to move the latter proportionately to the measuring movement of the feeler, cam control mechanism normally maintaining the feeler out of contact with the specimen and periodically releasing it for a measuring action thereby, said control mechanism including a master cam and drive means therefor conditioning the feeler for release at regular and relatively frequent intervals, and a further control unit to permit a measuring action of the feeler only at selected times when it is conditioned therefor by the master cam.

16. Wear measuring and recording mechanism according to claim 15 wherein the secondary or control unit comprises a plurality of rotary plates, one rotatable relative to the other, including a plural-notched short-time plate and a single-notched normal-period plate, together with a variable coupler, said plates cooperating with a common cam roll associated with lever means to release the feeler to control by the master cam, said plates and coupler adapted for rotation as a unit to afford measuring actuation for the feeler at regular intervals as determined by the normal-period plate, and means for setting said control unit to subdivide any such regular interval into a number of shorter intervals at which measuring actuation of the feeler is permitted, as determined by the short-time plate, said control unit subsequently automatically resuming its said unitary operation.

17. In wear measuring and recording mechanism for sheet-material wear-testing apparatus, a feeler movable to and from contact with a test specimen to measure its wear, a marker proportionately moved by the feeler, a drum carrying a cylindrically disposed chart over which the marker is moved in the axial direction, a rotary shaft supporting the drum, rotary cam mechanism for controlling the feeler periodically to afford a measuring and marking actuation thereof, said mechanism including a master cam and a variable time-control unit, a driving element having said master cam fixed thereon, gearing connections between said driving element and the chart drum shaft and between said driving element and the variable time-control unit of the feeler control mechanism, said connections including change-speed gearing common both to the drum shaft and to said unit, to increase or decrease the normal measuring and marking intervals and to increase or decrease the chart speed accordingly, operating and position-indicating means for said change-speed gearing, other means for adjusting said time-control unit to subdivide a normal measuring and marking interval, whether a longer or a shorter interval as determined by said change-speed gearing, into a plurality of lesser intervals for the feeler and marker actuations, and an indicating device associated with said adjusting means visually to show the elapsed and remaining portions of the normal measuring and marking interval then in progress.

18. Wear measuring mechanism for sheet material wear-testing apparatus, comprising, in combination, a feeler adapted for movement to and from contact with the wearing surface of a test specimen to measure the extent of wear, control mechanism normally maintaining the feeler out of contact with the specimen and periodically releasing it for a measuring action thereby, said control mechanism including a master release-control element and drive means therefor conditioning the feeler for release at regular and relatively frequent intervals, and a subsidiary control unit to complete the release of the feeler for a measuring action thereby only at selected times when it is conditioned therefor by the master release-control element.

19. Wear measuring apparatus according to claim 18 wherein the said control unit comprises relatively adjustable members effective in one adjusted position to effect said measuring action of the feeler at determined intervals and in another adjusted position to subdivide such determined interval into shorter intervals between measuring actions of the feeler.

20. Wear measuring apparatus according to claim 18 including adjusting means operatively associated with the control mechanism selectively to vary the time intervals between the permitted measuring actions.

21. Wear measuring apparatus according to claim 18 including an indicating device associated with the control mechanism visually to show the elapsed and remaining portions of an interval between measuring actions.

EDGAR F. HATHAWAY.
WALTER BIXBY.